2,930,820
ALKYLATION OF TOLUENE

Robert S. Aries, Stamford, Conn.

No Drawing. Application September 16, 1957
Serial No. 683,986

5 Claims. (Cl. 260—671)

This invention relates to a novel method for the alkylation of toluene. More particularly, the invention is concerned with a new method for the production of cymenes by the propylation of toluene in the presence of an activated clay type catalyst.

Alkylated toluenes are useful as blending stocks for the production of aviation gasoline and motor fuels to which they impart valuable antiknock qualities. In refinery practice, toluene or aromatic fractions which contain toluene may be alkylated catalytically with olefin feed stocks to form both mono- and polyalkylated toluenes.

The cymenes (isopropyltoluenes) form ortho, meta, and para isomers, which are liquids. In addition to being made catalytically, cymenes, especially para-cymene, may be obtained from waste sulfite liquor, and by dehydrogenation of monocyclic terpenes. The cymenes are used as solvents, in synthetic resin manufacture, and for oxidation to hydroperoxides for use in synthetic rubber manufacture. The cymenes can be oxidized to the corresponding toluic acids or methylbenzoic acids which are more readily separated than the cymene isomers, or the oxidation can be carried further to produce the various phthalic acids.

It is known to alkylate toluene with such catalysts as aluminum chloride, sulfuric acid, solid phosphoric acid and the like, of which aluminum chloride is generally considered the most useful. However, aluminum chloride has certain disadvantages as a catalyst, including a lack of selectivity toward particular olefin alkylating agents. Furthermore, aluminum chloride has the disadvantage that it is extremely sensitive to the presence of even traces of moisture with which it reacts immediately and vigorously with liberation of hydrogen chloride, which corrodes the equipment and destroys the catalyst. Aluminum chloride is also inherently corrosive to equipment per se, and because of its high reactivity in the alkylation of toluene it may lead to formation of unwanted isomers.

In addition to the above named catalysts, the use of activated clays has been suggested in connection with alkylation of toluene in the production of motor fuels, as for example, in U.S. Patent 2,242,960. In U.S. Patent 2,115,884 there is described the alkylation of benzene with a catalyst which is an acid washed clay sold commercially under the trademark "Tonsil," made by treating selected clays with a mineral acid and washing out the reaction products. The use of these types of activated clay disclosed in the prior art has not led to commercially useful results in alkylation processes, in that they produce yields which are not as satisfactory as those obtainable, for example, with aluminum chloride, or the other generally used catalysts.

In accordance with this invention, I have found that the use of a particular type of acid activated clay as a catalyst in the alkylation of toluene with olefins produces greatly enhanced yields, permits lower operating temperatures, and has numerous other advantages disclosed below. These unexpectedly superior results are obtained when using acid activated catalyst materials made relatively pure crystals of the mineral montmorillonite $(MgAl)O \cdot Al_2O_3 \cdot 5SiO_2 \cdot nH_2O$. These activated clay catalyst materials are produced by a limited treatment of native clays of the montmorillonite type, for example by heating with a mineral acid such as sulfuric or hydrochloric acid to solubilize certain undesirable components of the clay, followed by distilled or soft water washing until the product is substantially freed from calcium ions and shows only slight residual acidity, and then followed by treatment with a metal salt solution to precipitate a metal oxide thereon. Thus a solution of aluminum or magnesium sulfate and ammonia is used to precipitate aluminum or magnesium oxide, or manganese nitrate is used to precipitate manganese oxide in the clay. Such clays are available commercially, as for example Filtrol Grade 13 (sold by Filtrol Corporation, Vernon, Calif.).

Activated clay catalysts of the type described are white powders, having an analysis, in the case of Filtrol 13, of 72.7% $SiO_2$, 17.0% $Al_2O_3$, 1.4% $Fe_2O_3$, 4.3% MgO, 1.6% CaO, balance minor impurities. They have a surface area of about 300 sq. m. per gram, a specific gravity of 2.65, a particle density of 1.3, and bulk density of 45 lbs. per cu. ft., and a fineness such that 100% passes through a 100 mesh screen, and 73% through a 325 mesh screen.

These activated clays are noncorrosive and may be used as catalysts for the alkylation of toluene in mild steel vessels, and the alkylation results in lesser formation of unwanted by-products than when the usual alkylating agents such as aluminum chloride or supported phosphoric acid, are used. Furthermore, these activated clays when used as alkylation catalysts for toluene show little tendency to catalyze isomerization or disproportionation which would lead to greater complexity of the mixture of products formed, and render more difficult their separation.

In accordance with the novel process of my invention, the alkylation of toluene may be carried out in the liquid phase by passing an olefinic gas, such as, for example, propylene, amylene, butylene, and the like, or a gas containing any of these hydrocarbons, into an excess of toluene, in the presence of an activated clay of the type described.

I have also found that when polyisopropylbenzenes, such as are obtained as a normal by-product of the alkylation of benzene by propylene, are dealkylated in the presence of toluene, using the aforementioned activated clay catalyst, an important fraction of the resulting products consists of the various cymenes.

The use of a considerable molar excess of toluene over propylene tends to limit the amount of formation of polyisopropyltoluenes, so that in the reaction I have found that a molar ratio of 3 to 5 moles of toluene to 1 mole of propylene gives good results, with 4 moles of toluene per mole of propylene being probably the optimum. Of course, the alkylation reaction also occurs well outside of these molar ratios, toluene ratios higher than 5 moles per mole of propylene giving a purer product containing less of the polyisopropyltoluenes but requiring distillation and recovery of the larger excess of toluene used, while the lower toluene ratios than 3 moles per mole of propylene tend to give higher percentages of polyisopropyl compounds. Thus the ratios given are determined not so much by chemical factors as by economic factors, and if the polyisopropyltoluenes are considered useful products by themselves or as intermediates, ratios of toluene to propylene as low as 1:1 would be useful.

A suitable reaction temperature range is from about 90° to 110° C., but the temperature preferably is about 100° C. The reaction velocity is lower at 90° C., and higher at 110° C. It is preferable to have both the toluene and the propylene dried as thoroughly as possible, because at the preferred temperature range, moisture in either of the reactants tends to accumulate in the reaction vessel, since it may not be distilled out of the hydrocarbon mixture using toluene quite as readily as when, for example, lower boiling benezene is being alkylated.

The following examples illustrate the invention, it is not to be regarded as limited thereto.

Example 1

100 grams of activated clay (Filtrol Grade 13) was dried by refluxing with 2 liters of toluene and then distilling off 500 ml. of toluene which carried over a small amount of water. The anhydrous slurry was then diluted with 1500 ml. of dry nitration grade toluene to give 3 liters of a toluene suspension containing 100 grams (less the water content) of activated clay. The whole charge in the 5 liter flask was set in an oil bath. The flask had a gas inlet tube dipping down into the liquid as far as possible, a mercury sealed stirrer, a reflex condenser with a trap below the condenser return tube to hold back any water distilled over, and a thermometer. The oil bath was heated to 100° C. Propylene (C.P. grade, not less than 99% propylene content) was fed in slowly through the gas inlet tube. In the course of two hours 70 grams of dried propylene was fed in at a constant rate with continuous stirring and the consumption of propylene gradually increased as evidenced by the decreasing size of the escaping gas bubbles, after which the rate of absorption seemed to be constant. Additional propylene was fed in at the rate of 35 grams per hour for 7 additional hours, making a total feed of 315 grams and corresponding to a molar ratio of toluene to propylene of approximately 4:1. After the propylene feed was discontinued heating to 100° C. with agitation was continued for an additional hour and the charge was cooled to room temperature. The solution was decanted through a filter, avoiding as far as possible carrying over any solid to the filter and the residual slurry was shaken up with 200 ml. of fresh dry toluene, which after settling was also decanted to the filter. The total filtered liquid was distilled from a two liter filter flask with a fractionating head up to 145° C., adding fresh liquid to be distilled as the toluene was distilled off, until the entire charge had been distilled to 145° C. as measured in the vapor stream. The residue was approximately 1050 ml. and weighed 910 grams. This was then distilled slowly through the fractionating head to give a high reflux ratio during the distillation. There was obtained as a forerun to 170° C. 120 grams of toluene containing a small amount of cymenes, then between 170° and 185° C. 600 grams of a fraction consisting essentially of cymenes, and a residue boiling above 185° C. of 185 grams consisting of polyisopropyltoluene containing some cymene.

A sample of the cymene fraction was oxidized carefully to the mixed phthalic acids, and these to the methyl esters. From the total data it is estimated that the cymene fraction consists of about 60% meta-cymene, 30% paracymene and 10% ortho-cymene.

Example 2

This was run similarly to Example 1, except that the gas used to alkylate the toluene was a propane-propylene mixture, with propane and propylene present in equal amounts by weight, and containing a total of about 2% ethane and isobutane and about 0.3% of ethylene. 630 grams of the mixed propane-propylene gas was fed into the alkylation flask beneath the liquid surface as in Example 1, at the rate of approximately 50 grams per hour in a total time of 12½ hours. After all the gas was added, the charge was heated with agitation for an additional hour at 100° C. and was then separated by fractionation as in Example 1. After the bulk of the excess toluene was removed by distilling to 145° C., the residue which measured approximately one liter was carefully and slowly fractionated. The fraction boiling between 170° and 185° C. was 572 grams consisting essentially of mixed cymenes, and a residue boiling above 185° C. of 176 grams consisting essentially of polyisopropyltoluenes containing some cymene.

Example 3

A polyisopropylbenzene fraction obtained as the high boiling residue in the catalytic production of cumene by the alkylation of benzene with propylene was used as the raw material. A kilo of this polyisopropylbenzene material obtained as the residue by distilling out the cumene to 170° C. at atmospheric pressure and having a volume of 1120 ml. was distilled under the vacuum of a water aspirator until 120 ml. was recovered as distillate. This was done to remove as much existing cumene as possible from the mixture. The residue of 893 grams, after cooling, was diluted with a slurry of dry activated clay (Filtrol Grade 13) in toluene, 350 grams of the clay in 2 liters of toluene, which had been dehydrated by adding the clay to 2.5 liters of toluene and distilling off 500 ml. of toluene to remove water. The total mixture of 2 liters of toluene, 893 grams of polyisopropylbenzene and 350 grams of anhydrous activated clay was then heated to 110° C. with stirring under reflux for 12 hours. The product was cooled and decanted through a filter taking care to transfer only a trace of solid to the filter. The heavy residue was diluted twice with 500 grams each time of toluene, allowed to settle and the supernatant liquid decanted through the filter and finally the slurry was transferred to the filter and allowed to drip dry. The total filtrate was then distilled slowly. A low boiling forerun was obtained to 113° C. the temperature necessary to take off the first liter of distillate. This consisted of a mixture of benzene and toluene. The benzene resulted from the complete dealkylation of a portion of the polyisopropylbenzenes. The amount of the benzene thus formed was estimated from the specific gravity of the first liter of distillate to be about 180 grams of benzene. Distillation was continued until amount of toluene contained in this first liter plus an additional amount taken over weighed 1 kilo. This was assumed to be the toluene used in washing the product of the dealkylation through the filter. The residue in the flask represented the product of the dealkylation charge less its benzene content which was already removed in the first liter of distillate. The amount of this forerun was 1180 grams, 180 grams of benzene and 1000 grams of toluene.

The remainder of the charge was slowly distilled under a high reflux ratio through a 10 plate column to give a toluene fraction to 150° C., a cumene fraction 150–170° C., a cymene fraction 170–185° C., and a residue boiling above 185° C., and consisting essentially of polyisopropyl compounds of benzene and toluene.

Based on the results obtained in the above fractionation, the dealkylation of the 893 grams of polyisopropylbenzene in 2 liters (approximately 1720 grams) of toluene with concurrent alkylation of the toluene, yielded 180 grams of benzene
    220 grams of residual polyisopropyl compounds
    400 grams of cumene
    775 grams of cymenes
    900 grams of unconverted toluene
    ―――
Total    2475 grams of recovered products
Loss    138 grams

I claim:

1. Method for the alkylation of toluene which comprises reacting toluene in the liquid phase at substantially atmospheric pressure with an olefin at a temperature between about 90° and 110° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

2. Method for the production of cymenes which comprises reacting toluene in the liquid phase at substantially atmospheric pressure with propylene at a temperature between about 90° and 110° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

3. Method for the production of cymenes which comprises reacting from about 3 to 5 moles of toluene with 1 mole of propylene in the liquid phase at substantially atmospheric pressure in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

4. Method for the production of cymenes which comprises reacting about 4 moles of toluene with 1 mole of propylene, in the liquid phase at substantially atmospheric pressure, at a temperature between about 90° and 110° C. in the presence of an alkylation catalyst comprising activated montmorillonite clay which has been acid-treated, washed with water until substantially freed from calcium ions and showing only slight residual acidity and then treated with a metal salt solution to precipitate an oxide of said metal thereon.

5. Method for the conversion of polyisopropylbenzene to cymenes and cumene which comprises heating the polyisopropylbenzene with toluene at a temperature of about 110° C. in the presence of an alkylation catalyst comprising activated montmorillonite which has been acid-treated, washed with water until substantially freed from calcium ions and showing only slight residual acidity and then treated with a metal salt solution to precipitate an oxide of said metal thereon.

References Cited in the file of this patent

UNITED STATES PATENTS

| | | |
|---|---|---|
| 2,564,488 | Mahan | Apr. 14, 1951 |
| 2,574,895 | Stecker | Nov. 13, 1951 |
| 2,660,572 | Feasley | Nov. 24, 1953 |
| 2,834,821 | Bergsteinsson | May 13, 1958 |

FOREIGN PATENTS

| | | |
|---|---|---|
| 316,951 | Great Britain | Nov. 6, 1930 |